US012602187B2

(12) United States Patent
Li et al.

(10) Patent No.: US 12,602,187 B2
(45) Date of Patent: Apr. 14, 2026

(54) SYSTEMS AND METHODS FOR COLLECTING TRACE DATA VIA A MEMORY DEVICE

(71) Applicant: Samsung Electronics Co., Ltd., Suwon-si (KR)

(72) Inventors: Dongyang Li, Milpitas, CA (US); Andrew Chang, Los Altos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/630,776

(22) Filed: Apr. 9, 2024

(65) Prior Publication Data

US 2025/0238164 A1 Jul. 24, 2025

Related U.S. Application Data

(60) Provisional application No. 63/624,422, filed on Jan. 24, 2024.

(51) Int. Cl.
*G06F 3/06* (2006.01)

(52) U.S. Cl.
CPC .......... *G06F 3/0659* (2013.01); *G06F 3/0604* (2013.01); *G06F 3/0683* (2013.01)

(58) Field of Classification Search
CPC ..... G06F 3/0659; G06F 3/0604; G06F 3/0683
See application file for complete search history.

(56) References Cited

U.S. PATENT DOCUMENTS

| | | | |
|---|---|---|---|
| 11,099,880 B2 | 8/2021 | Kumar et al. | |
| 11,314,635 B1 | 4/2022 | Volpe et al. | |
| 11,494,311 B2 | 11/2022 | Bradshaw et al. | |
| 11,526,290 B2 | 12/2022 | Koufaty et al. | |
| 11,663,138 B2 | 5/2023 | Erickson et al. | |
| 11,789,649 B2 | 10/2023 | Chatterjee et al. | |
| 2018/0059945 A1 | 3/2018 | Helmick et al. | |
| 2018/0074973 A1 | 3/2018 | Chan et al. | |
| 2021/0019069 A1* | 1/2021 | Sen ........................ G06F 12/122 |
| 2021/0271393 A1* | 9/2021 | Lin ..................... G06F 12/0868 |
| 2021/0405911 A1 | 12/2021 | Navon et al. | |
| 2022/0004488 A1* | 1/2022 | Paul .................... G06F 12/0238 |
| 2022/0113915 A1 | 4/2022 | Ki et al. | |

(Continued)

OTHER PUBLICATIONS

Maruf, Hasan AI, et al., "TPP: Transparent Page Placement for CXL-Enabled Tiered-Memory," arXiv:2206.02878v2 [cs.DC] May 28, 2023, 14 pages.

(Continued)

*Primary Examiner* — Eric Cardwell
(74) *Attorney, Agent, or Firm* — Womble Bond Dickinson (US) LLP

(57) ABSTRACT

Systems and methods for collecting trace data via a memory device are disclosed. One method may include receiving, by the memory device, a command from a computing device; identifying, by the memory device, first data associated with the command; storing, by the memory device, the first data in a first portion of volatile memory of the memory device for reading by the computing device; and accessing, by the memory device, a second portion of the volatile memory, wherein the second portion of the volatile memory is configured to store a copy of second data stored in a non-volatile memory of the memory device.

18 Claims, 6 Drawing Sheets

(56)     References Cited

U.S. PATENT DOCUMENTS

| | | |
|---|---|---|
| 2022/0206958 A1 | 6/2022 | LeMay et al. |
| 2023/0044342 A1 | 2/2023 | Wilkinson |
| 2023/0393744 A1 | 12/2023 | Meeramohideen Mohamed et al. |

OTHER PUBLICATIONS

Niu, Junpeng et al., "Hybrid Storage Systems: A Survey of Architectures and Algorithms," IEEE Access 6, Feb. 7, 2018, pp. 13385-13406.
Yang, Shao-Peng, et al. "Overcoming the Memory Wall with {CXL-Enabled}{SSDs}." 2023 *USENIX Annual Technical Conference (USENIX ATC* 23). 2023, 15 pages.
Extended European Search Report issued in corresponding EP Application No. 25150915.4, dated Jun. 16, 2025, 10 pages.

\* cited by examiner

400

| 402 | 404 | 406 |
|-----|-----|-----|
| R | Addr. 1 | Hit |
| W | Addr. 2 | Miss |
| R | Addr. 2 | Hit |
| R | Addr.3 | Miss |
| R | Addr. 4 | Miss |

FIG. 4

Start

Receive a first command from a computing device — 502

Identify first data associated with the first command — 504

Store the first data in a first portion of volatile memory of the memory device for reading by the computing device based on detecting a trigger — 506

Access a second portion of the volatile memory — 508

END

SYSTEMS AND METHODS FOR COLLECTING TRACE DATA VIA A MEMORY DEVICE

CROSS-REFERENCE TO RELATED APPLICATION(S)

The present application claims priority to and the benefit of U.S. Provisional Application No. 63/624,422, filed Jan. 24, 2024, entitled "MECHANISM TO COLLECT AND FILTER HOST PHYSICAL ADDRESS (HPA) ON CXL MEMORY DEVICE FOR AI INFERENCING," the entire content of which is incorporated herein by reference.

FIELD

One or more aspects of embodiments according to the present disclosure relate to memory devices, and more particularly to collecting, by a host device, trace data accumulated by the memory device.

BACKGROUND

An application running on a host computing device may need to read and write data to memory. As the amount data read and written to memory increases, the demand for storage devices and memory, and efficiently retrieving data from the storage devices and memory, may also increase.

The above information disclosed in this Background section is only for enhancement of understanding of the background of the present disclosure, and therefore, it may contain information that does not form prior art.

SUMMARY

One or more embodiments of the present disclosure are directed to a method comprising: receiving, by a memory device, a command from a computing device; identifying, by the memory device, first data associated with the command; storing, by the memory device, the first data in a first portion of volatile memory of the memory device for reading by the computing device; and accessing, by the memory device, a second portion of the volatile memory, wherein the second portion of the volatile memory is configured to store a copy of second data stored in a non-volatile memory of the memory device.

According to one or more embodiments, the command is for reading or writing the second data from or to the non-volatile memory, and the first data identifies a physical address associated with the second data.

According to one or more embodiments, the accessing of the second portion of the volatile memory is based on detecting the command.

According to one or more embodiments, the command is for performing a computation by the memory device, and the first data includes a result of the computation.

According to one or more embodiments, the reading by the computing device is based on detecting a trigger, wherein the trigger includes a signal by the memory device, the method further comprising: detecting, by the memory device, fullness of the first portion of the volatile memory; and generating, by the memory device, the signal based on the detecting of the fullness of the first portion of the volatile memory.

According to one or more embodiments, the first portion of the volatile memory is mapped to a first physical address space of the computing device and accessed by the computing device via a memory access operation.

According to one or more embodiments, the memory device is configured to transmit the second data to the computing device based on accessing the second portion of the volatile memory.

According to one or more embodiments, the computing device is configured to take an action based on the first data.

According to one or more embodiments, the action includes reconfiguring the second portion of the volatile memory for increasing a cache hit ratio.

According to one or more embodiments, the reconfiguring of the second portion includes modifying a cache algorithm.

One or more embodiments of the present disclosure are also directed to a memory device comprising: a controller; a volatile memory; and a non-volatile memory. The controller is configured to: receive a command from a computing device; identify first data associated with the command; store the first data in a first portion of the volatile memory for reading by the computing device; and access a second portion of the volatile memory, wherein the second portion of the volatile memory is configured to store a copy of second data stored in the non-volatile memory.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 4 depicts a block diagram of trace data that is collected and stored in a private memory according to one or more embodiments;

DETAILED DESCRIPTION

Figure 1:
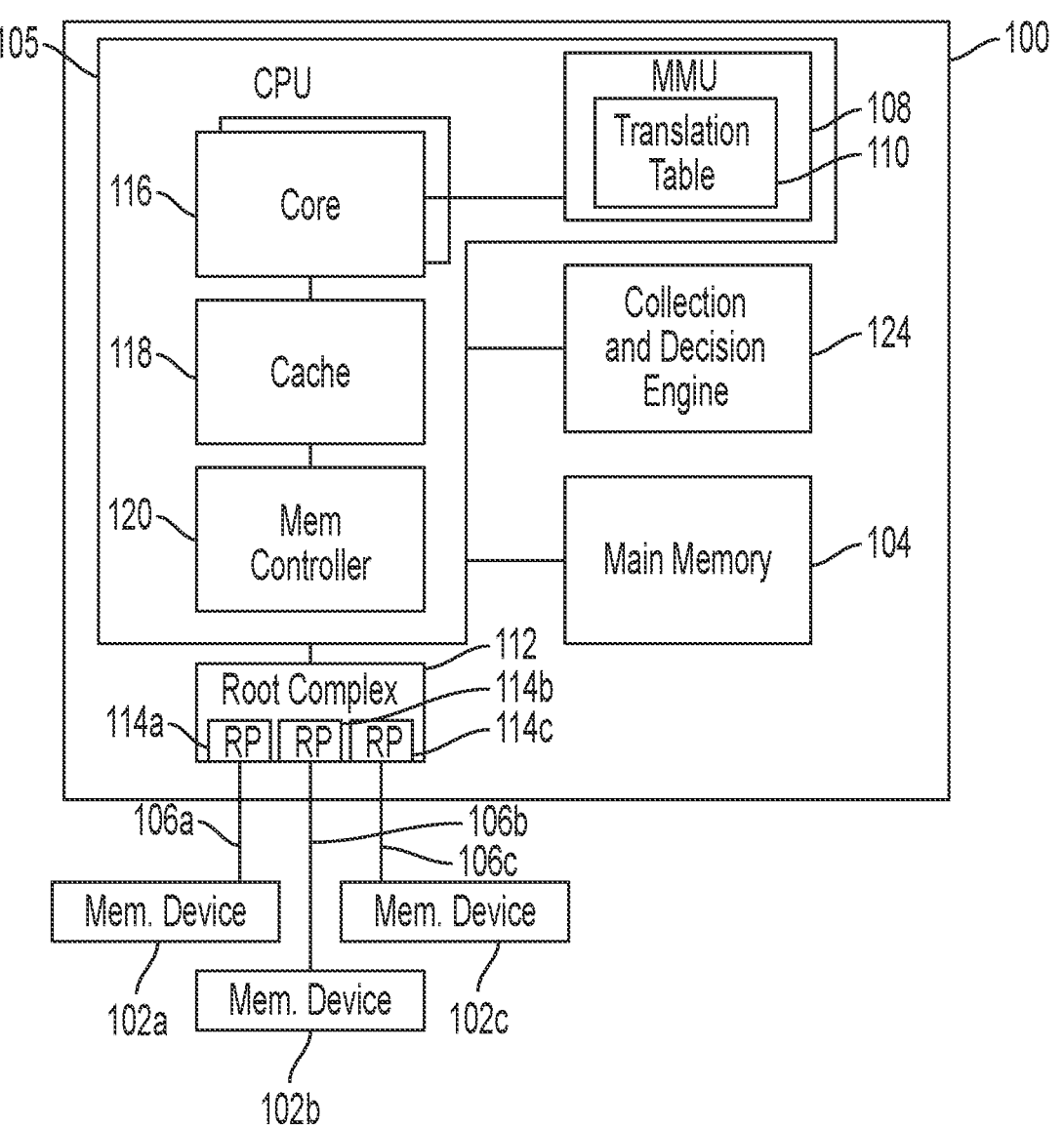
FIG. 1 depicts a block diagram of a system for collecting trace data on a memory device according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

Applications may perform computations of large amounts of data. As such types of computations increase, the demand for memory may also increase. Memory expansion technologies may help alleviate this problem by providing tiered memory subsystems that help increase memory capacity at a lower cost. The memory subsystem may include, for example, a memory device that adheres to a Compute Express Link (CXL) protocol. The memory device may include a volatile memory (e.g., a dynamic random access memory (DRAM)) and a non-volatile memory (NVM)). An application running on the host device may read and write data to the memory device via load and store commands, treating the memory device as an expansion of the main memory that is attached to the processor.

Latencies may be involved in accessing the memory device in the tiered memory subsystem. The performance of the memory device may depend, for example, on how efficiently the memory device is able to use its volatile memory to cache data. Thus, it may be desirable to track access of the physical memory addresses of the memory device as those accesses occur, for controlling, for example, the data that is cached into the volatile memory. It may be impractical, however, for the host to track the accesses via a software solution. For example, an application accessing the memory device uses virtual addresses to read and write data from and to the memory device. In order to obtain the physical addresses associated with the virtual addresses, the host OS may need to translate the virtual addresses to physical memory addresses via, for example, a page table. The translation of virtual to physical addresses may introduce undesirable latencies and consume extra computing resources of the host when implementing the software solution.

Tracking the memory accesses via a hardware solution (e.g., by the memory device itself), may help avoid some of the latencies and costs associated with the software solution for tracking memory accesses. For example, the hardware solution may avoid the translation of the virtual address to a physical address as part of the tracking process. However, the memory device is typically exposed as host managed device memory (HDM) for being managed and used by the host operating system (OS) the same way as the main memory. Thus, any page that the memory device may use to store the tracked physical memory addresses may not be available at a given time because the OS may allocate the page to another host application.

In general terms, embodiments of the present disclosure are directed to collecting physical memory addresses (generally referred to as trace data) on the memory device as a hardware solution, and providing access to the trace data to the host for making a management decision. In some embodiments, a portion of the volatile memory of the memory device is allocated as private memory. In some embodiments, the host maps the private memory as a direct access (DAX) region at run time. The memory device may include a trace collection engine configured to identify access of the physical memory addresses of the memory device by an application during run time. The access of the memory addresses may be via load and store commands. The trace collection engine may store the identified memory addresses in the private memory.

In some embodiments, the host (e.g., an application running on the host) accesses the trace data (e.g., the physical addresses) in the private memory. The host may access the trace data in response to detecting a trigger. The trigger may be, for example, a signal from the memory device indicating that there is trace data available for the host. The host may retrieve the trace data by accessing (e.g., directly accessing) the private memory with a load and store interface. The real-time access of the trace data provides the host accurate information of the data access patterns from the application. The host may make decisions for improving performance of the application and/or memory device based on the trace data. For example, the host may make prefetching and/or other cache management decisions for reducing latencies in accessing the memory device.

Although the trace data according to the various embodiments is described as physical memory addresses, the various embodiments are not limited thereto, and may include other types of data produced by the memory device. For example, the memory device may be configured to perform various types of computations including machine learning computations for inference and/or training. The trace data stored in the private memory may be the results of such computations for providing direct, real-time access of the results to the host.

FIG. 1 depicts a block diagram of a system for collecting trace data on a memory device according to one or more embodiments. The system includes a host computing device (referred to as the "host") 100 coupled to a one or more endpoints such as, for example, one or more memory devices 102a-102c (collectively referenced as 102).

The host 100 includes, without limitation, a processor 105, main memory 104, and root complex (RC) interface 112. The processor 105 may include one or more central processing unit (CPU) cores 116 configured to execute computer program instructions and process data stored in a cache memory (simply referred to as "memory" or "cache") 118. The cache 118 may be dedicated to one of the CPU cores 116 or shared by various ones of the CPU cores. It should be appreciated that although a CPU is used to describe the various embodiments, a person of skill in the art will recognize that a GPU or other computing unit may be used in lieu or in addition to a CPU.

The cache 118 may be coupled to a memory controller 120 which in turn is coupled to the main memory 104. The main memory 104 may include, for example, a dynamic random access memory (DRAM) storing computer program instructions and/or other types of data (collectively referenced as data) similar to the memory device 102. In order for a CPU core 116 to execute instructions or retrieve data provided by the memory device 102, the corresponding data may be loaded into the cache 118, and the CPU core may consume the data (e.g., directly) from the cache memory. If the data to be consumed is not already in the cache 118, a cache miss may occur, and the memory device 102 may need to be queried to load the data. For example, if the data to be consumed is not in the cache 118, a cache miss logic may query the data from memory (e.g., main memory (e.g., DRAM) 104 or memory device 102) based on a mapped virtual or physical address.

In some embodiments, the processor 105 (e.g., an application running on the processor) generates data access requests for the memory devices 102. One or more of the data access requests may include a virtual memory address of a location to write or read data. The processor 105 may invoke a memory management unit (MMU) 108 to translate the virtual address to a physical address for processing the request. Although the MMU 108 is depicted in FIG. 1 as being part of the processor 105, a person of skill in the art should recognize that the MMU 108 may be a device/circuit separate from the processor 105. The MMU 108 may include a translation table 110 that maps virtual addresses to physical addresses. In some embodiments, the MMU 108 is stored in the main memory 104. The request transmitted to the memory device 102 for fulfilling the data access request may include the physical address corresponding to the virtual address.

In some embodiments, the host 100 exchanges signals or messages with the memory devices 102 via the RC interface 112 and interface connections 106a-106c (collectively referenced as 106). For example, the host 100 may transmit a request (e.g., a load or store request) over the RC interface 112 and interface connections 106 for reading or writing data from or to the memory devices 102. Messages from the memory devices 102 to the host 100, such as, for example, responses to the requests from the host, may be delivered over the interface connections 106 to the RC interface 112, which in turn delivers the responses to the processor 105. The memory devices 102 may further transmit signals including, for example, certain types of notifications, to the host 100 over the RC interface 112 and interface connections 106.

In some embodiments, the interface connections 106 (e.g., the connector and the protocol thereof) include a memory expansion bus such as, for example, a Compute Express Link (CXL), although embodiments are not limited thereto. For example, the interface connections 106 (e.g., the connector and the protocol thereof) may also include a general-purpose interface such as, for example, Ethernet, Universal Serial Bus (USB), and/or the like. In some embodiments, the interface connections 106 may include (or may conform to) a Cache Coherent Interconnect for Accelerators (CCIX), dual in-line memory module (DIMM) interface, Small Computer System Interface (SCSI), Fiber Channel, Serial Attached SCSI (SAS), iWARP protocol, InfiniBand protocol, 5G wireless protocol, Wi-Fi protocol, Bluetooth protocol, and/or the like.

The RC interface 112 may be, for example, a CXL interface configured to implement a root complex for connecting the processor 105 and main memory 104 to the memory devices 102. The RC interface 112 may include one or more ports 114a-114c to connect the one or more memory devices 102 to the RC. In some embodiments, the MMU 108 and/or translation table 110 may be integrated into the RC 112 interface for allowing the address translations to be implemented by the RC interface.

The memory device 102 may include one or more of a volatile computer-readable storage medium and/or non-volatile computer-readable storage medium. In some embodiments, one or more of the memory devices 102 include memory that is attached to a CPU or GPU, such as, for example, a CXL attached memory device (including volatile and persistent memory device), RDMA attached memory device, and/or the like, although embodiments are not limited thereto. The CXL attached memory device (simply referred to as CXL memory) may adhere to a CXL.mem protocol where the host 100 may access the memory using commands such as load and store commands. In this regard, the host 100 may act as a requester and the CXL memory may act as a subordinate.

In some embodiments, the memory devices 102 are included in a memory system that allows memory tiering to deliver an appropriate cost or performance profile. In this regard, the different types of storage media may be organized in a memory hierarchy or tier based on a characteristic of the storage media. The characteristic may be access latency. In some embodiments, the tier or level of a memory device increases as the access latency decreases. In some embodiments, an application may query a storage medium with the lowest tier when data is to be retrieved before querying a storage medium of a higher tier.

In some embodiments, the one or more of the memory devices 102 are memory devices of the same or different type, that are aggregated into a storage pool. For example, the storage pool may include one or more CPU or GPU attached memory devices.

In some embodiments, one or more of the memory devices 102 is configured to monitor and collect certain types of data (hereinafter referred to as trace data) at run time (e.g., during execution of an application). The trace data may include, for example, a physical address of the memory device 102 requested by the host 100, results of a computation performed by the memory device 102, and/or the like.

In some embodiments, the host 100 includes a collection and decision (C&D) engine 124 configured to retrieve the trace data collected by the memory device 102. The C&D engine 124 may be implemented via software, firmware, or hardware, or a combination software, firmware, and/or hardware. The software, firmware, and/or hardware may be part of (or executed) by the processor 105.

In some embodiments, the C&D engine 124 is configured to make decisions based on the retrieved trace data. Example decisions may include, for example, managing data stored in the cache 118, main memory 104, and/or the memory devices 102 (collectively referred to as storage media), generating prefetch instructions, configuring or reconfiguring the memory device 102, and/or the like. For example, the C&D engine 124 may manage data in the memory device 102 by promoting or demoting pages in and out of the different tiers of the memory device. In this regard, the C&D engine 124 may analyze the trace data for physical addresses accessed by the application. The C&D engine 124 may determine, based on the trace data, that certain physical addresses are accessed more often than other physical addresses, and should therefore remain in a cache of the memory device 102. In other examples, the C&D engine 124 may modify a cache algorithm (e.g., a cache replacement algorithm) based on the trace data.

Figure 2:
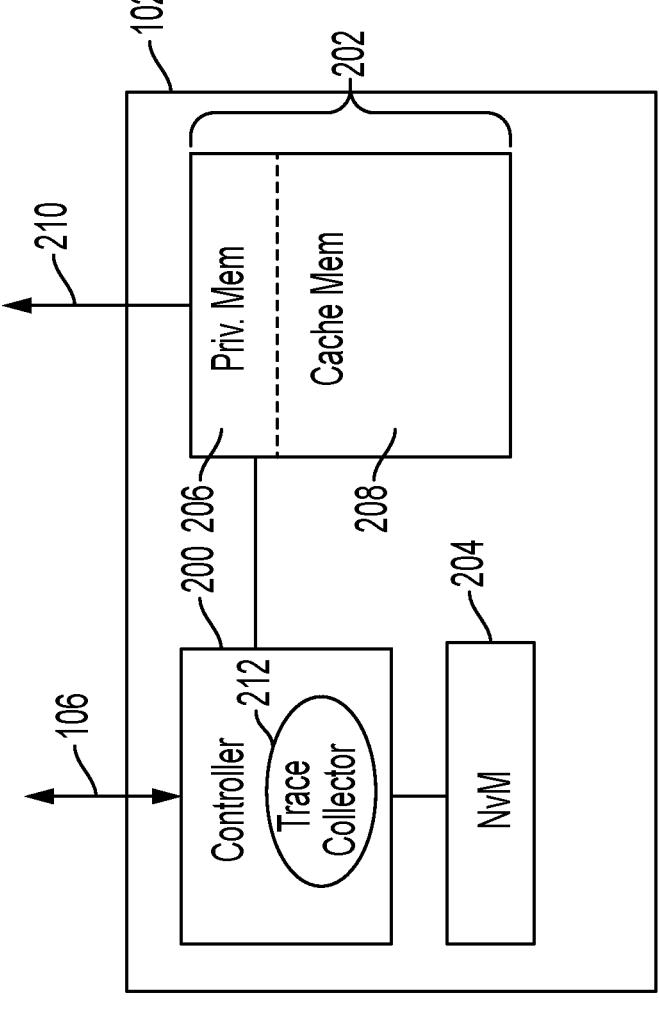
FIG. 2 depicts a block diagram of a memory device according to one or more embodiments.

FIG. 2 depicts a block diagram of the memory device 102 according to one or more embodiments. In some embodiments, the memory device 102 includes a storage controller 200, storage memory 202, and non-volatile memory (NVM) 204. The storage controller 200 may be configured to exchange commands and/or data with the RC interface 112 over the interface connections 106. In this regard, the storage controller 116 may include at least one processor or processing component embedded thereon for interfacing with the host 100, the storage memory 202, and the NVM 204. The processing component may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the storage memory 202 or NVM 204 according to the data access instructions.

The storage memory 202 may be high-performing memory of the storage device 102, and may include (or may be) volatile memory, for example, such as DRAM, but the present disclosure is not limited thereto, and the storage memory 202 may be any suitable kind of high-performing volatile or non-volatile memory. Although a single storage memory 202 is depicted for simplicity sake, a person of skill in the art should recognize that the storage device 102 may include other local memory for temporarily storing other data for the storage device.

In some embodiments, the storage memory 202 is divided into a first portion (hereinafter referred to as "private memory") 206, and a second portion (hereinafter referred to as "cache memory") 208 which is isolated from the first portion. For example, the storage memory 202 may have a total capacity of 128 GB. A first amount (e.g., 8 GB) of the total capacity may be allocated or reserved as the private memory 206, and a second amount (e.g., 120 GB) of the total capacity may be allocated or reserved as the cache memory 208.

The private memory 206 may be exposed to the processor 105 as persistent memory that resides on the memory bus. In this regard, the private memory 206 emulates a persistent memory. The host 100 (e.g., the C&D engine 124) may access (e.g., directly access) the private memory 206 over a memory interface 210 without the need for address translation by the MMU 108. In some embodiments, the host 100 accesses the private memory 206 using a memory access operation such as, for example, a memory read operation.

In some embodiments, the direct access to the private memory 206 is via a direct access (DAX) mechanism which may otherwise be used to directly access a file stored in persistent memory. In using the DAX mechanism, a persistent memory-aware file system may recognize that a file is stored in the persistent memory and map the persistent memory directly into an application's address space. The application may read and write the file data to the persistent memory without the need of the host OS (e.g., the memory controller 120) to cache files into the cache 118.

In some embodiments, the cache memory 208 is used for caching copies of data stored in the NVM 204. In this regard, the cache memory 208 may store copies of data stored in the NVM 204. For example, data that is to be accessed by an application in the near future may be copied from the NVM 204 to the cache memory 208 for allowing the data to be retrieved from the cache memory instead of the NVM 204. In this regard, the trace data stored in the private memory 206 may be used for prefetching the data into the cache memory 208. The host 100 may access the trace data using the DAX mechanism to make the prefetching decision.

In some embodiments, the cache memory 208 has a lower access latency than the NVM 204. Thus, in some embodiments, accessing data from the cache memory 208 helps improve overall system performance and responsiveness.

In some embodiments, the cache memory 208 and the NVM 204 operate under a non-uniform memory architecture (NUMA) memory model and participate in the tiered memory subsystem. In this regard, the cache memory 208 and the NVM 204 may form a NUMA node that functions as a last level cache to the host processor 105.

In some embodiments, the NVM 204 persistently stores data received, for example, from the host 100. The NVM 204 may include, for example, one or more NAND flash memory, but the present disclosure is not limited thereto, and the NVM 204 may include any suitable kind of memory for persistently storing the data according to an implementation of the storage device 102 (e.g., magnetic disks, tape, optical disks, and/or the like).

In some embodiments, the controller 200 is configured with a trace collection engine (hereinafter referred to as a trace collector) 212 for capturing data access requests from the host 100 (e.g., by an application executed by the processor 105). The trace collector 212 may be implement via software, firmware (e.g., ASIC), hardware, or a combination of software, firmware, and/or hardware. For example, the trace collector 212 may be an FPGA block. In another example, the trace collector 212 may be software executed by the controller 200.

The trace collector 212 may identify a load or store request from the host, and a host physical address included in the request. In some embodiments, the trace collector 212 stores (e.g., sequentially stores) the identified host physical address in the private memory 206 as trace data. The trace data stored in the private memory 206 may be directly accessible to the host processor 105 (e.g., via the DAX mechanism), without the need for address translations or caching into the CPU cache 118.

In some embodiments, the trace collector 212 engages in filtering and/or sampling of the trace data for storing filtered or sampled trace data in the private memory 206. For example, if the same host physical address is accessed multiple times by the host 100, the trace collector 212 may store the physical address once in the private memory 206, and include additional data associated with the stored physical address for indicating the number of times the address was accessed. In another example, if a repeated pattern of physical address accesses is detected (e.g., addresses 1, 3, 5, and 7 accessed multiple times), the pattern may be recorded once along with a value indicative of the number of times the pattern was repeated. In a further example, if the accesses are to sequential memory addresses (either increasing or decreasing in order) a start physical address may be recorded along with a length of the sequence. Embodiments are not limited thereto, however, and the trace collector 212 may employ other data compression mechanisms for storing data in the private memory 206.

In some embodiments, the controller 200 is configured to execute one or more computation functions. The computation functions may include, for example computations for training or making inferences via a machine learning model. The computations may also relate to encryption, decryption, compression, decompression, and/or the like. In some embodiments, results of the computation functions are stored in the private memory 206 for direct access by the host processor 105.

In some embodiments, the trace collector 212 monitors for a condition for signaling the host 100 to access the collected trace data. The condition may include, for example, fullness of the private memory 206. For example, the trace collector 212 may signal the host 100 to access the collected trace data based on detecting that the private memory 206 has been filled to a threshold percentage (e.g., 100%, 95%, etc.) of its allocated capacity. In this regard, the trace collector 212 may write a flag in a configuration register that notifies that host 100 that trace data is available. The host 100 (e.g., the C&D engine 124) may periodically (e.g., on a regular or irregular basis) poll the configuration register via, for example, the CXL.io protocol, to check for the flag. The C&D engine may retrieve the trace data based on detecting the flag.

Figure 3:
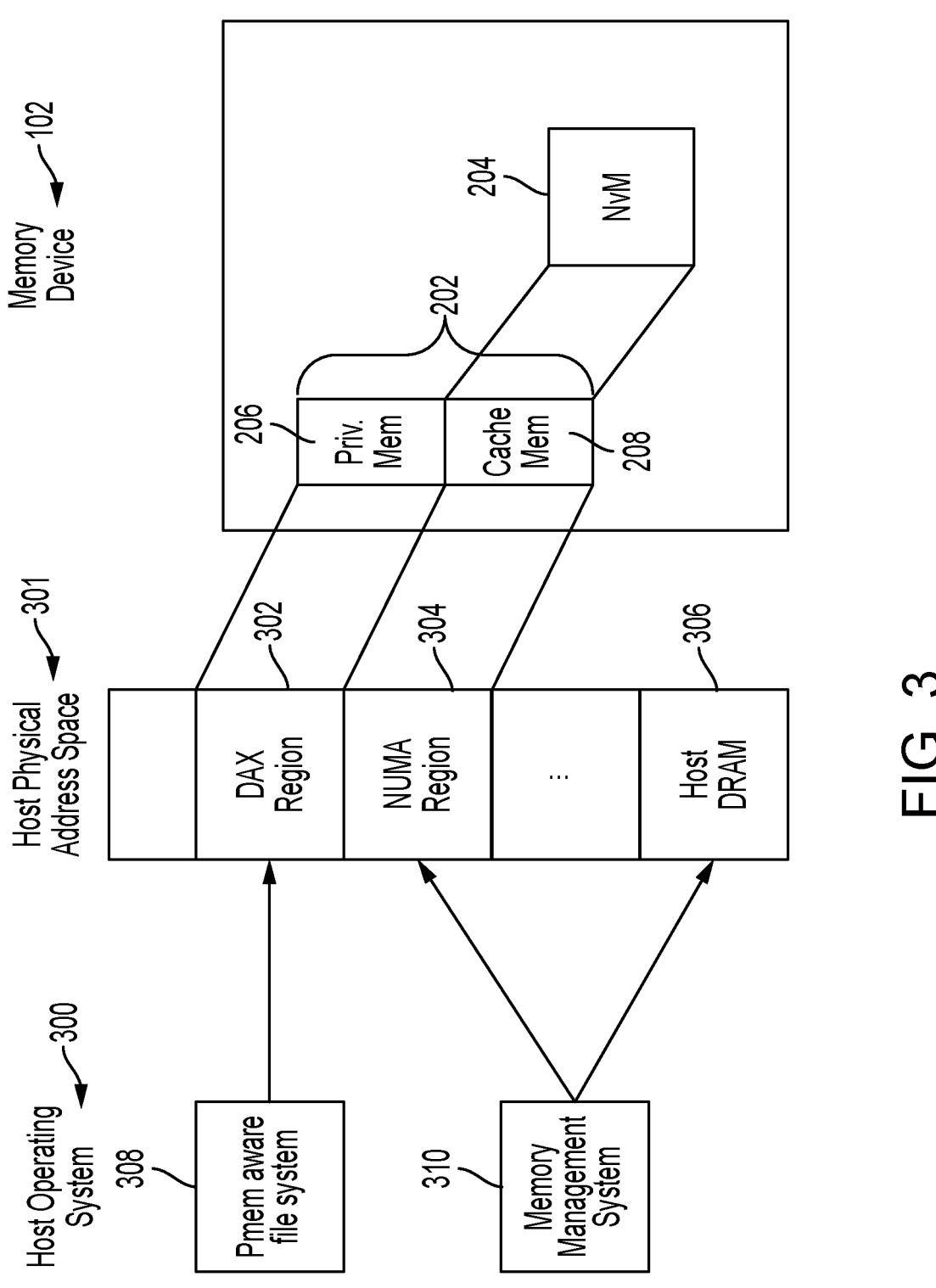
FIG. 3 depicts a block diagram of a representation and management of a memory device by a host processor according to one or more embodiments.

FIG. 3 depicts a block diagram of a representation and management of the memory device by the host processor 105 according to one or more embodiments. In some embodiments, the memory device 102 is preconfigured so that a first amount of the storage memory is set as the private memory 206, and a second amount of the storage memory is set as the cache memory 208. For example, if the total capacity of the storage memory 202 is 128 GB, 8 GB of the storage memory may be allocated or designated as private memory 206, and the remaining 120 GB of the storage memory may be allocated or designated as cache memory 208. In some embodiments, the allocation or reallocation of the private and cache memories may be configurable by the host 100.

The memory device 102 may advertise its storage capacity and type of storage to the host (e.g., during startup of the memory device 102). In some embodiments, the memory device 102 advertises the first amount of the private memory 206 as persistent memory that may be accessed (e.g., directly) via DAX. The memory device 102 may also advertise the second amount of the cache memory 208 as a NUMA node. The capacity of the NVM 204 (e.g., the NUMA node capacity) may also be advertised to the host 100.

A host OS 300 may map the memory device 102 to a host physical address space 301 based on the advertised information. In some embodiments, a persistent memory (pmem) aware file system 308 is configured to recognize the private memory 206 as emulated persistent memory, and map the private memory to a first host-managed device memory (HDM) region (hereinafter referred to as a DAX region 302). The size of the DAX region 302 may be equal to the allocated size of the private memory 206.

In some embodiments, a memory management system 310 is configured to recognize the NVM 204 as a NUMA node, and map the NVM 204 to a second HDM region of the host physical address space (hereinafter referred to as a NUMA region 304). The size of the NUMA region 304 may be equal to the size of the NVM 204. The host physical address space 301 may also include other types of memory such as, for example, a host DRAM 306 (which may be similar to the main memory 104).

In some embodiments, the pmem aware file system 308 allows the direct access of the addresses mapped to the DAX region 302, to retrieve the trace data stored in the private memory 206. The access may be via memory read operations of the private memory 206 via the memory interface 210. The read operation may be via a read API such as, for example the C programming language API as follows:

read (cxl_dev, offset, length)
      where the "cxl_dev" identifies the memory device 102, "offset" identifies the address of the private memory 206 that has been mapped to the DAX region 302, and "length" identifies the amount of data to be read. The length may correspond to all of the trace data in the private memory 206, or a subset of the trace data.

In some embodiments, the memory management system 310 may dynamically allocate and deallocate the memory addresses in the NUMA region 304 to an application at runtime. The application may use virtual addresses to perform data access operations. The memory management system 310 may invoke the MMU 108 to translate the virtual addresses to the physical addresses in the NUMA region 304, and forward load or store commands to the physical addresses for processing by the memory device 102. The memory device 102 may check the cache memory 208 for determining whether the requested data is in the cache memory. The memory device 102 may access the NVM 204 in the event that the requested data is not in the cache memory 208.

FIG. 4 depicts a block diagram of trace data 400 that is collected and stored in the private memory 206 according to one or more embodiments. The trace data 400 may include a type of access 402 (e.g., read or write access) that was received from an application on the host 100, and a physical address 404 that was accessed by the application. In some embodiments, the trace data includes one or more bits for indicating whether the access resulted in a "hit" or "miss" 406. For example, a "hit" may be identified if the address that was accessed was located in the cache memory 208, and a "miss" may be identified if the address that was accessed was not located in the cache memory 208.

Figure 5:
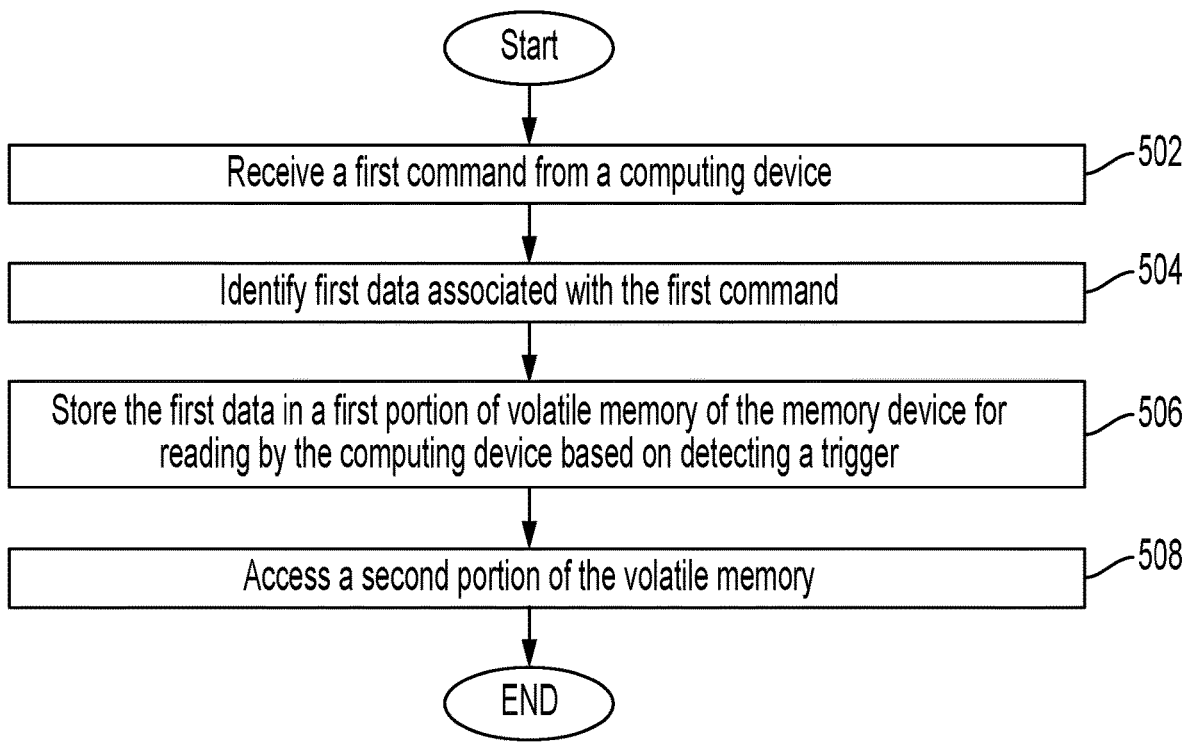
FIG. 5 depicts a flow diagram of a process for collecting trace data via a memory device according to one or more embodiments.

FIG. 5 depicts a flow diagram of a process for collecting trace data via the memory device 102 according to one or more embodiments. The process starts, and the memory device 102 (e.g., the storage controller 200) receives a first command from a computing device (e.g., the host 100). The first command may be a data computation command, a load or store command, or the like.

In act 504, the trace collector 212 identifies first data associated with the first command. The first data may include, for example, the physical address that is included in the load or store command. In some embodiments, the first data includes results of a computation performed by the storage controller 200.

In act 506, the trace collector 212 stores the first data in a first portion of a volatile memory of the memory device 102. For example, the first portion may be the private memory 206 of the storage memory 202 in the memory device 102. The first data may be stored sequentially in the private memory 206.

In the embodiment where the first command is a load or store command, the storage controller 200 accesses a second portion of the volatile memory of the memory device 102. For example, the second portion may be the cache memory 208.

The load or store command may be generated in response to an application transmitting a read or write request to a virtual memory address. The MMU 108 may translate the virtual memory address to a physical address. The physical address may be an address mapped to the NUMA region 304. The root complex 112 may transmit a load or store command that includes the physical address to the memory device 102 for processing. The storage controller 200 may check the cache memory 208 for determining whether the requested data exists in the cache memory. If the data exists in the cache memory 208, the request may be fulfilled based on the data in the cache memory without the need to access the NVM 204.

Figure 6:
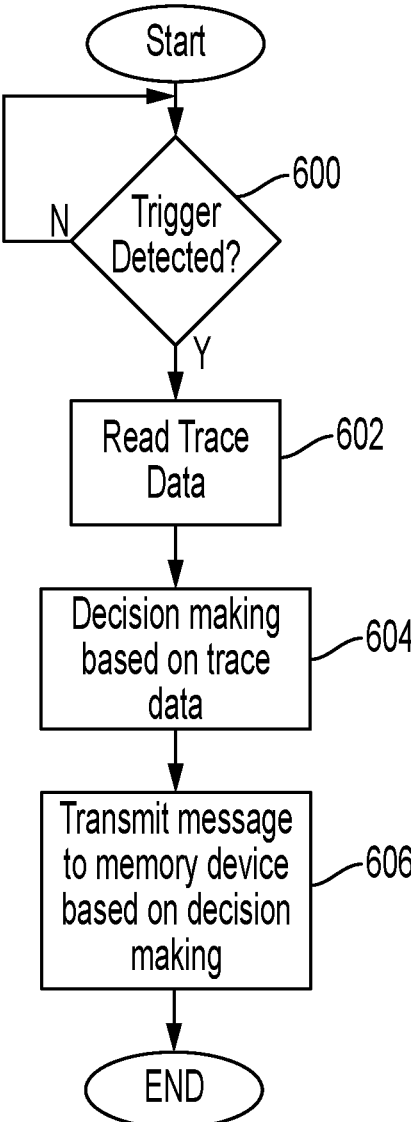
FIG. 6 depicts a flow diagram of a process executed by a collection and decision engine for collecting trace data and making decisions based on the collected trace data according to one or more embodiments.

FIG. 6 depicts a flow diagram of a process executed by the C&D engine 124 for collecting trace data and making decisions based on the collected trace data according to one or more embodiments. The process starts, and in act 600, the C&D engine 124 determines whether a trigger has been detected. The trigger may be for example, a flag in the configuration register that indicates that trace data is available for collection.

If the trigger is detected, the C&D engine 124 retrieves the trace data from the private memory 206 in act 602. In some embodiments, the C&D engine 124 retrieves the trace data by accessing the addresses in the DAX region 302 that are mapped to the private memory 206, and performing a read operation on the addresses. The read operation may allow the trace data to be retrieved (e.g., directly) from the private memory 206 via the memory interface 210, without the need for any address translation by the MMU 108.

In act 604, the C&D engine 124 processes the trace data for decision making. For example, the C&D engine 124 may decide that the cache memory 208 should be reconfigured to improve the cache hit ratio. In one example, the C&D engine 124 may detect that hit misses are above a set threshold. In this case, the C&D engine 124 may decide that a current cache algorithm such as, for example, a cache replacement algorithm, prefetching algorithm, and/or the like, should be modified for improving the cache hit ratio.

In another example, the C&D engine 124 may detect, by analyzing the trace data, a pattern of physical memory addresses accessed by an application. For example, the C&D engine 124 may detect that a group of addresses that are frequently accessed together. In this case, the C&D engine 124 may decide that data corresponding to the detected group of addresses should remain in the cache memory 208 without being evicted.

In act 606, the C&D engine 124 may transmit a message to the memory device 102 based on the decision made in act 604. For example, the message may include a command to reconfigure the cache memory 208 (e.g., switch the cache algorithm from and least recently used (LRU) cache algorithm to a clock based cache algorithm). In some embodiments, the message includes program instructions for executing by the controller 200 to implement the reconfiguration.

One or more embodiments of the present disclosure (e.g., the C&D engine 124, storage controller 200, and/or trace collector 212) may be implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for collecting trace data via a memory device have been specifically described and illustrated herein, many modifications and variations will be apparent to those skilled in the art. Accordingly, it is to be understood that systems and methods for collecting trace data via a memory device constructed according to principles of this disclosure may be embodied other than as specifically described herein. The disclosure is also defined in the following claims, and equivalents thereof.

The systems and methods for collecting trace data via a memory device may contain one or more combination of features set forth in the below statements.

Statement 1. A method comprising: receiving, by a memory device, a command from a computing device; identifying, by the memory device, first data associated with the command; storing, by the memory device, the first data in a first portion of volatile memory of the memory device for reading by the computing device; and accessing, by the memory device, a second portion of the volatile memory, wherein the second portion of the volatile memory is configured to store a copy of second data stored in a non-volatile memory of the memory device.

Statement 2. The method of Statement 1, wherein the command is for reading or writing the second data from or to the non-volatile memory, and the first data identifies a physical address associated with the second data.

Statement 3. The method of Statement 2, wherein the accessing of the second portion of the volatile memory is based on detecting the command.

Statement 4. The method of Statement 1, wherein the command is for performing a computation by the memory device, and the first data includes a result of the computation.

Statement 5. The method of Statement 1, wherein the reading by the computing device is based on detecting a trigger, wherein the trigger includes a signal by the memory device, the method further comprising: detecting, by the memory device, fullness of the first portion of the volatile memory; and generating, by the memory device, the signal based on the detecting of the fullness of the first portion of the volatile memory.

Statement 6. The method of Statement 1, wherein the first portion of the volatile memory is mapped to a first physical address space of the computing device and accessed by the computing device via a memory access operation.

Statement 7. The method of Statement 1, wherein the memory device is configured to transmit the second data to the computing device based on accessing the second portion of the volatile memory.

Statement 8. The method of Statement 1, wherein the computing device is configured to take an action based on the first data.

Statement 9. The method of Statement 8, wherein the action includes reconfiguring the second portion of the volatile memory for increasing a cache hit ratio.

Statement 10. The method of Statement 9, wherein the reconfiguring of the second portion includes modifying a cache algorithm.

Statement 11. A memory device comprising: a controller; a volatile memory; and a non-volatile memory, wherein the controller is configured to: receive a command from a computing device; identify first data associated with the command; store the first data in a first portion of the volatile memory for reading by the computing device; and access a second portion of the volatile memory, wherein the second portion of the volatile memory is configured to store a copy of second data stored in the non-volatile memory.

Statement 12. The memory device of Statement 11, wherein the command is for reading or writing the second data from or to the non-volatile memory, and the first data identifies a physical address associated with the second data.

Statement 13. The memory device of Statement 12, wherein the controller being configured to access the second portion of the volatile memory is based on the controller being configured to detect the command.

Statement 14. The memory device of Statement 11, wherein the command is for performing a computation by the memory device, and the first data includes a result of the computation.

Statement 15. The memory device of Statement 11, wherein the reading by the computing device is based on detecting a trigger, wherein the trigger includes a signal by the memory device, wherein the controller is further configured to: detect fullness of the first portion of the volatile memory; and generate the signal based on the detecting of the fullness of the first portion of the volatile memory.

Statement 16. The memory device of Statement 11, wherein the first portion of the volatile memory is mapped to a first physical address space of the computing device and is configured to be accessed by the computing device via a memory access operation.

Statement 17. The memory device of Statement 11, wherein the controller is further configured to transmit the second data to the computing device based on accessing the second portion of the volatile memory.

Statement 18. The memory device of Statement 11, wherein the computing device is configured to take an action based on the first data.

Statement 19. The memory device of Statement 18, wherein the action includes reconfiguring the second portion of the volatile memory for increasing a cache hit ratio.

Statement 20. The memory device of Statement 19, wherein the reconfiguring of the second portion includes modifying a cache algorithm.

What is claimed is:

1. A method comprising:
advertising, by a memory device, a first portion of a volatile memory of the memory device as a first type of memory having a first size, and a second portion of the volatile memory as a second type of memory different from the first type of memory, the second portion having a second size, wherein the first type of memory is configured to emulate a persistent memory;
receiving, by the memory device, a command from a computing device;
identifying, by the memory device, a memory address and a type of memory access associated with the command;
storing, by the memory device in the first portion of the volatile memory of the memory device, the memory address and identification of the type of memory access;
providing a notification for the computing device;
based the notification, receiving by the memory device a request for information stored in the first portion of the volatile memory; and
providing, based on the request, the memory address and the identification of the type of memory access for processing by the computing device to make a configuration decision for the second portion of the volatile memory.

2. The method of claim 1, wherein the command is for reading or writing second data from or to a non-volatile memory of the memory device, and the memory address identifies a physical address associated with the second data.

3. The method of claim 2, further comprising: accessing the second portion of the volatile memory is based on detecting the command.

4. The method of claim 1, wherein the command is for performing a computation by the memory device, the method further comprising:
identifying, by the memory device, a result of the computation; and
storing, by the memory device, the result of the computation in the first portion of the volatile memory.

5. The method of claim 1, further comprising:
detecting, by the memory device, fullness of the first portion of the volatile memory; and
generating, by the memory device, the notification based on the detecting of the fullness of the first portion of the volatile memory.

6. The method of claim 1, wherein the first portion of the volatile memory is mapped to a first physical address space of the computing device and accessed by the computing device via a memory access operation.

7. The method of claim 1, wherein the memory device is configured to transmit second data to the computing device based on accessing the second portion of the volatile memory.

8. The method of claim 1, wherein the configuration decision includes reconfiguring the second portion of the volatile memory for increasing a cache hit ratio.

9. The method of claim 8, wherein the reconfiguring of the second portion includes modifying a cache algorithm.

10. A memory device comprising:
a controller;
a volatile memory; and
a non-volatile memory,
wherein the controller is configured to:
   advertise a first portion of the volatile memory as a first type of memory having a first size, and a second portion of the volatile memory as a second type of memory different from the first type of memory, the second portion having a second size, wherein the first type of memory is configured to emulate a persistent memory;
   receive a command from a computing device;
   identify a memory address and a type of memory access associated with the command;
   store the memory address and identification of the type of memory access in the first portion of the volatile memory;
   provide a notification for the computing device;
   based the notification, receive a request for information stored in the first portion of the volatile memory; and
   provide, based on the request, the memory address and the identification of the type of memory access for processing by the computing device to make a configuration decision for the second portion of the volatile memory.

11. The memory device of claim 10, wherein the command is for reading or writing second data from or to a non-volatile memory of the memory device, and the memory address identifies a physical address associated with the second data.

12. The memory device of claim 11, wherein the controller is further configured to access the second portion of the volatile memory is based on the controller being configured to detect the command.

13. The memory device of claim 10, wherein the command is for performing a computation by the memory device, and the controller is further configured to:
   identify a result of the computation; and
   store the result of the computation in the first portion of the volatile memory.

14. The memory device of claim 10, wherein the controller is further configured to:
   detect fullness of the first portion of the volatile memory; and
   generate the notification based on the detecting of the fullness of the first portion of the volatile memory.

15. The memory device of claim 10, wherein the first portion of the volatile memory is mapped to a first physical address space of the computing device and is configured to be accessed by the computing device via a memory access operation.

16. The memory device of claim 10, wherein the controller is further configured to transmit second data to the computing device based on accessing the second portion of the volatile memory.

17. The memory device of claim 10, wherein the configuration decision includes reconfiguring the second portion of the volatile memory for increasing a cache hit ratio.

18. The memory device of claim 17, wherein the reconfiguring of the second portion includes modifying a cache algorithm.

* * * * *